(12) United States Patent
Booker et al.

(10) Patent No.: US 7,549,712 B2
(45) Date of Patent: Jun. 23, 2009

(54) FRONT LOCKING DEVICE FOR RELEASABLY ENGAGING A DRAWER TO A DRAWER SLIDE

(75) Inventors: Todd Booker, Garner, NC (US); Georg Domenig, Kernersville, NC (US)

(73) Assignee: Grass America, Inc., Kernersville, NC (US)

(*) Notice: Subject to any disclaimer, the term of this patent is extended or adjusted under 35 U.S.C. 154(b) by 222 days.

(21) Appl. No.: 10/844,888

(22) Filed: May 13, 2004

(65) Prior Publication Data

US 2004/0227440 A1    Nov. 18, 2004

Related U.S. Application Data

(60) Provisional application No. 60/470,131, filed on May 13, 2003.

(51) Int. Cl.
*A47B 88/00* (2006.01)
(52) U.S. Cl. .................. 312/334.6; 312/333; 312/334.5
(58) Field of Classification Search .................. 312/333, 312/334.1, 334.6, 334.7, 334.8, 334.14, 334.44, 312/334.46, 330.1, 334.5, 334.4; 403/109.3, 403/326–330; 384/21–22
See application file for complete search history.

(56) References Cited

U.S. PATENT DOCUMENTS

| | | | | |
|---|---|---|---|---|
| 4,423,914 A * | 1/1984 | Vander Ley | .................. | 312/333 |
| 4,473,262 A | 9/1984 | Staye | | |
| 4,494,806 A | 1/1985 | Williams et al. | | |
| 4,749,242 A * | 6/1988 | Rechberg | .................... | 312/333 |
| 4,842,422 A * | 6/1989 | Nelson | ........................ | 384/19 |
| 4,923,259 A | 5/1990 | Bartok | | |
| 4,995,683 A * | 2/1991 | Albiez | ..................... | 312/348.4 |
| 4,998,828 A | 3/1991 | Hobbs | | |
| 5,039,181 A * | 8/1991 | Lautenschlager | ........ | 312/334.7 |
| 5,281,021 A * | 1/1994 | Rock et al. | ............. | 312/334.32 |
| 5,302,016 A * | 4/1994 | Lautenschlager et al. | ... | 312/333 |
| 5,439,283 A * | 8/1995 | Schroder et al. | ......... | 312/334.4 |
| 5,542,759 A * | 8/1996 | Krivec | ................... | 312/334.44 |
| 5,564,807 A | 10/1996 | Rock et al. | | |
| 5,580,139 A * | 12/1996 | Grabher | ...................... | 312/333 |
| 5,588,729 A * | 12/1996 | Berger | ..................... | 312/334.4 |
| 5,664,855 A * | 9/1997 | Lautenschlager et al. | | 312/334.4 |
| 6,913,334 B2 * | 7/2005 | Weichelt | .................. | 312/334.4 |

(Continued)

OTHER PUBLICATIONS

International Search Report mailed Oct. 5, 2005 corresponding to PCT/US2004/014990.

*Primary Examiner*—Hanh V Tran
(74) *Attorney, Agent, or Firm*—Kilpatrick Stockton LLP

(57) ABSTRACT

A system for releasably securing a drawer to a drawer slide includes a drawer slide, a catch insert for receiving and securing a portion of a locking lever, a drawer, a locking lever comprising at least one tooth, pivotably mounted to the drawer and a spring for releasably engaging the at least one tooth in contact with the catch insert. The catch insert can be mounted in the aperture provided in the drawer slide and can include a plurality of ridges and grooves aligned in a direction parallel to the sliding direction of the drawer, and can extend in a direction perpendicular to the sliding direction of the drawer. The locking lever can include a plurality of teeth, which are aligned in a direction parallel to the sliding direction of the drawer, and can extend in a direction perpendicular to the sliding direction of the drawer.

8 Claims, 2 Drawing Sheets

U.S. PATENT DOCUMENTS

| | | | |
|---|---|---|---|
| 6,945,618 B2 * | 9/2005 | Kim et al. | 312/334.4 |
| 7,014,282 B2 * | 3/2006 | Hammerle | 312/334.4 |
| 7,244,006 B2 * | 7/2007 | Schwaerzler et al. | 312/334.4 |
| 2004/0095047 A1 | 5/2004 | Salice | |

* cited by examiner

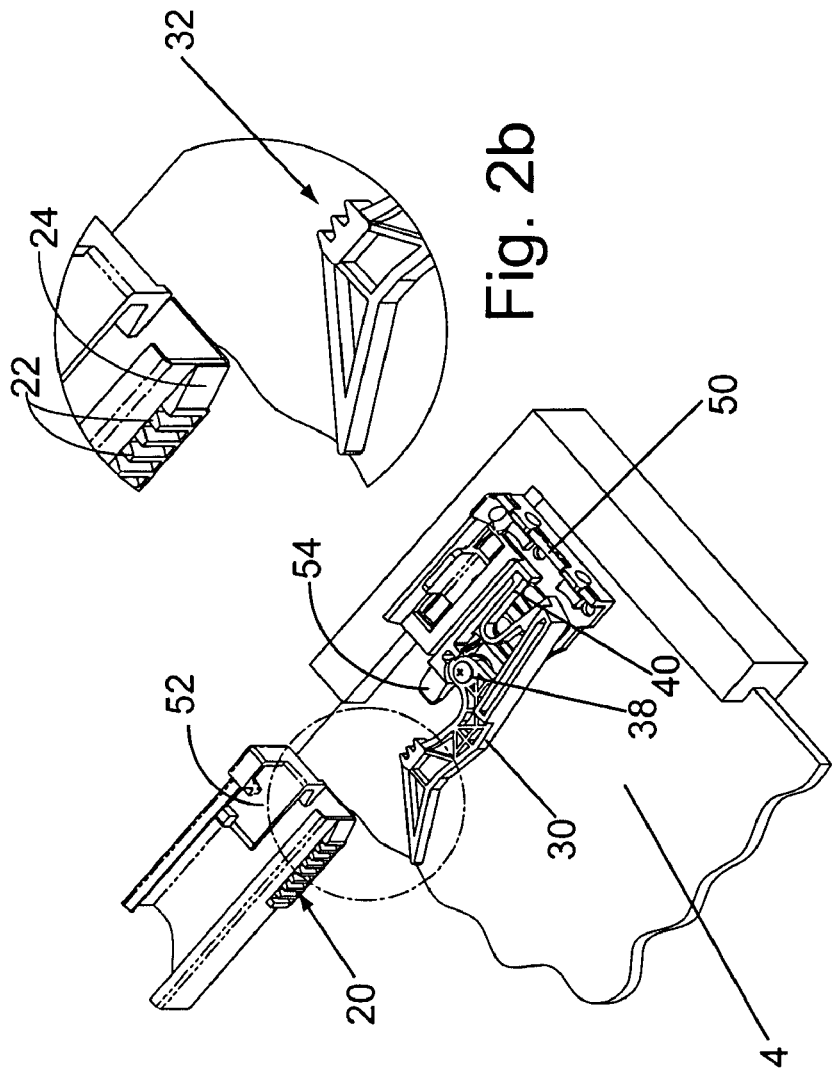

FRONT LOCKING DEVICE FOR RELEASABLY ENGAGING A DRAWER TO A DRAWER SLIDE

CROSS REFERENCE TO RELATED APPLICATIONS

The present application claims priority under 35 U.S.C. § 119(e) from U.S. Provisional Patent Application Ser. No. 60/470,131, filed May 13, 2003, the disclosure of which is incorporated herein by reference.

FIELD OF THE INVENTION

The present invention relates to a device for releasably engaging a drawer to a drawer slide. More particularly, the present invention relates to a device mounted to the underside of a drawer which hooks onto and retains one end of a drawer slide member, and provides means for releasing said drawer from said drawer slide member.

BACKGROUND OF THE INVENTION

Drawers are commonly mounted in furniture frames using drawer slide assemblies. A first drawer slide is mounted to the furniture frame, and a second drawer slide is mounted to the drawer. Often a third drawer slide is provided between the first and second drawer slides to enhance the reach of the drawer and allow a full and complete extension outside the furniture frame. This configuration makes objects in the rear of the drawer more accessible to the user.

The drawer slides facilitate the orientation and alignment of the drawer as it travels in and out of the furniture frame. Further, the drawer slides enhance the slideability of the drawer by providing a low friction sliding means through the use of wheels, rollers or the like. This provides a significant advantage over wooden drawer frames.

For a variety of reasons, often a drawer must be removed from the drawer slide system. In the past, this involved careful extraction of the drawer and one or more of the drawer slide members from the furniture frame. Often, the drawer slide would be screwed into the drawer requiring tools to disassemble the system.

To facilitate removal of a drawer from the furniture frame, various attempts have been made to provide a means for releasably mounting a drawer and drawer slides to the furniture frame. One such attempt is presented in U.S. Pat. No. 5,281,021 to Rock et al., which provides drawer guide assemblies on respective opposite sides of a drawer for guiding sliding movement of said drawer, each said drawer guide assembly including a pull-out rail to be slideable with said drawer during sliding movement thereof, and means for removeably attaching said drawer to said pull-out rails so that said drawer may be removed from said pull-out rails without removing said pull-out rails from said drawer guide assemblies. The means for removeably attaching the drawer include a pull-out rail having a catch edge, a drawer having a catch element having formed thereon a plurality of stop surfaces that are staggered and offset relative to each other in a direction inclined to a direction of sliding movement of said drawer and to a longitudinal direction of said pull-out rail, thereby ensuring that one of said stop surfaces will align with an abut said catch edge and means for urging said catch element toward said pull-out rail so that said stop means will abut said catch edge.

This design provides an apparatus for releasing a drawer from a drawer slide, but requires a user to reach around the side of the drawer to actuate a lever for releasing the stop surfaces from the catch edge. Further, this system requires specialized design of the drawer slides to provide a "catch edge" for the stop surfaces to engage.

Another similar device is described in U.S. Pat. No. 4,473,626 to Staye, wherein an upper surface of the drawer slide is formed with a notch, a rail is connected on a side of the drawer and rests on the drawer slide, and a catch is connected to the rail, the catch releasably engaging the notch in the drawer slide.

Again, in this design, the latching and unlatching mechanism is located on the side of the drawer and incorporated into the drawer slide system making the unlatching of the drawer from the drawer slide system difficult for a user to access.

Thus, there is a need for a simple, yet secure system for releasably attaching a drawer to a drawer slide system, where the engagement means are located near the front of the drawer and preferably on the underside of the drawer where their access is not impeded by the drawer slide members.

It would further be desirable to provide such a system that is easily incorporated into present drawer slide systems without the need for complex redesign of the drawer slides or other components.

SUMMARY OF THE INVENTION

In a first aspect of the present invention, a front locking device for releasably securing a drawer to a drawer slide is provided comprising a drawer slide comprising catch means for receiving and securing a portion of a locking lever, a drawer, a locking lever comprising at least one tooth, pivotably mounted to the drawer and spring means for releasably engaging the at least one tooth in contact with the catch means.

In one embodiment of the present invention, the catch means comprises a plurality of ridges and grooves formed in the surface of the drawer slide. In another embodiment of the present invention, the catch means comprises a catch insert mounted in an aperture provided in the drawer slide comprising a plurality of ridges and grooves. In a preferred embodiment of the present invention, the plurality of ridges and grooves are aligned in a direction parallel to the sliding direction of the drawer, and extend in a direction perpendicular to the sliding direction of the drawer.

In an additional embodiment of the present invention, the locking lever comprises a plurality of teeth, which are aligned in a direction parallel to the sliding direction of the drawer, and extending in a direction perpendicular to the sliding direction of the drawer.

In a further embodiment of the present invention, the spring means comprises a spring member positioned toward the front of the drawer in advance of the pivot point of the locking lever. An additional embodiment of the present invention comprises a rear attachment member extending from the drawer slide to secure and retain a rear portion of the drawer.

In a second aspect of the present invention, a front locking device for releasably securing a drawer to a drawer slide member comprising a drawer, a drawer slide comprising a plurality of ridges and grooves formed in the front portion of said drawer slide in a direction parallel to the sliding direction of the drawer, and facing in a direction substantially perpendicular to the sliding direction of the drawer, and a locking lever comprising at least one tooth, pivotably mounted to a front portion of the drawer in a manner such that the at least one tooth faces a direction perpendicular to the sliding direction of the drawer opposite the direction of the plurality of ridges and grooves of the drawer slide, said at least one tooth being encouraged toward the plurality of ridges and grooves by a spring member acting upon a portion of the locking lever opposite the pivot point.

In an embodiment of the present invention, the front locking device comprises a catch means mounted to a drawer engaging slide member and a locking lever comprising at least one tooth. In a preferred embodiment of the present invention, the catch means comprises a substantially rectangular block with a plurality of grooves extending from one side. The interlocking block is attachably mounted to one side of a drawer slide. In another embodiment of the present invention, the catch means comprises a portion of the drawer slide itself, i.e., catch means formed from and built into the side of the drawer slide.

The locking lever is pivotably mounted to the underside of a drawer with the tooth facing substantially perpendicular to the sliding direction of the drawer. As the drawer is mounted and slid along the drawer slide, the tooth is forced into one of the plurality of grooves in the catch means by a spring element on the opposing side of the pivot point. With the tooth engaged to a groove in the catch means, the drawer is thereby secured to the drawer slide. Lateral motion perpendicular to the direction of motion of the drawer is prevented through the interlocking of the three drawer slide members as is known in the art. By providing a disengageable front locking mechanism as in the present invention, the drawer may be easily dismounted from the drawer slide and removed from the assembly.

Features of a front locking device for releasably engaging a drawer to a drawer slide of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

A front locking device for releasably engaging a drawer to a drawer slide of the present invention provides numerous advantages over prior drawer attachment devices For example, the present invention advantageously provides an adjustable front locking device which is easily accessible and provides adjustable attachment of the drawer to a drawer slide system.

As will be realized by those of skill in the art, many different embodiments of a front locking device for releasably engaging a drawer to a drawer slide according to the present invention are possible. Additional uses, objects, advantages, and novel features of the invention are set forth in the detailed description that follows and will become more apparent to those skilled in the art upon examination of the following or by practice of the invention.

BRIEF DESCRIPTION OF THE DRAWINGS

FIG. 2a is a view of a front locking device of the present invention mounted to the underside of a drawer in an embodiment of the present invention.

FIG. 2b is a detailed view of a front locking device in an embodiment of the present invention.

DETAILED DESCRIPTION

Figure 1:
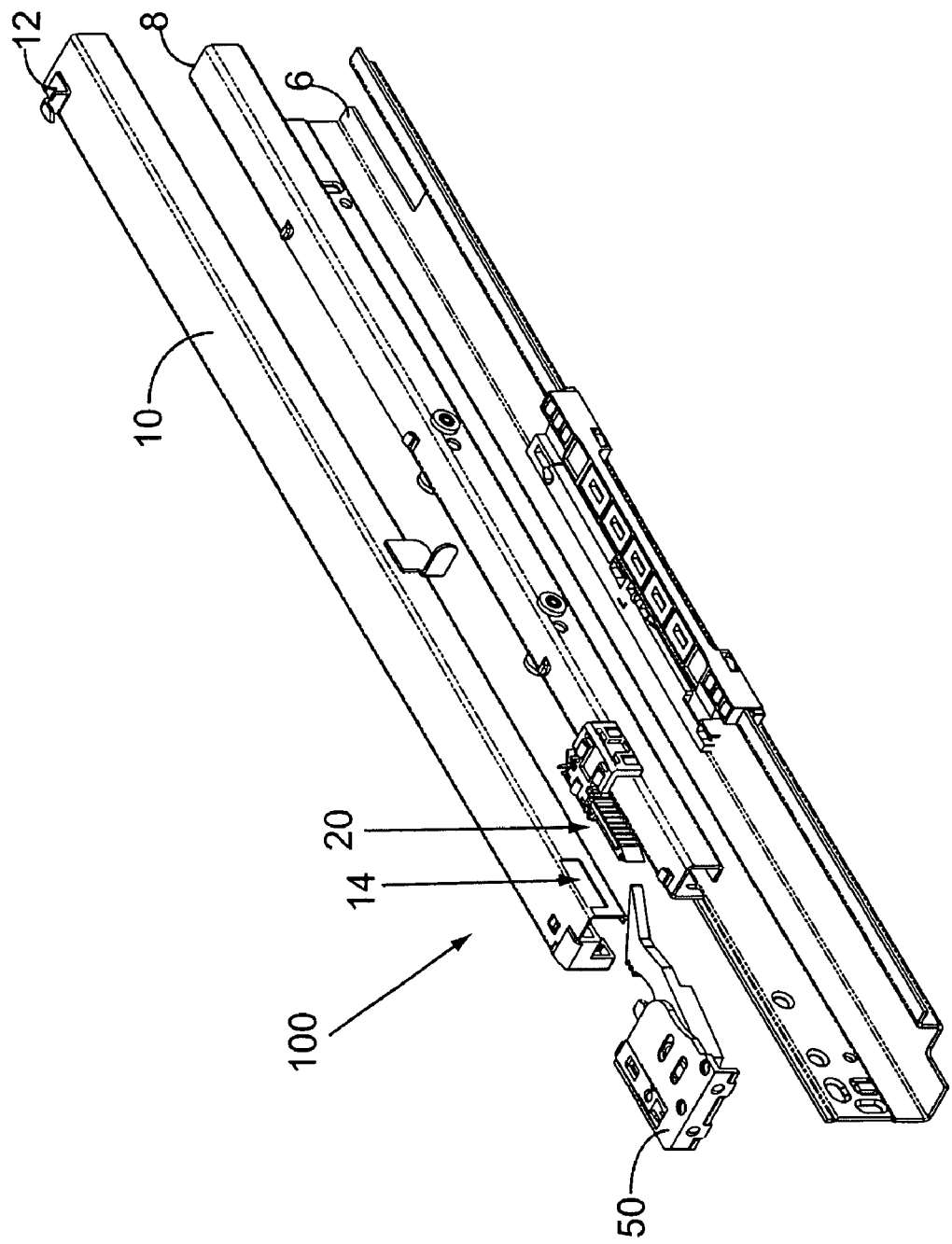
FIG. 1 is an exploded view of a front locking device of the present invention incorporated into a drawer slide system in an embodiment of the present invention.

In a first aspect of the present invention, a front locking device is provided comprising a drawer slide having a plurality of catch means thereon, a locking lever mounted to a drawer and having a tooth thereon for engaging the catch means of the drawer slide, and spring means for releasably engaging the tooth to the catch means of the drawer slide.

One preferred embodiment of the present invention is illustrated in FIGS. 1, 2a, and 2b. The front locking device of the present invention is adaptable to be mounted in a conventional drawer slide system with little modification of the drawer slides. As is commonly seen in drawer slide systems, a fixed drawer slide 6 is mounted in a fixed position to a furniture frame member. An intermediate drawer slide 8 is engaged to and slideable upon the fixed drawer slide 6. A drawer engaging slide member 10 is mounted to the underside of a drawer 2 and fixed relative to the drawer 2. The drawer engaging slide member 10 is further engaged to and slideably upon the intermediate drawer slide member 8.

In this three drawer slide configuration, a full extension of the drawer from the furniture frame is provided. While this three drawer slide configuration is the preferred configuration for use with the present invention, one skilled in the art will recognize the utility front locking device of the present invention with other drawer slide systems, for example a two slide drawer slide system comprising a fixed slide mounted to the furniture frame, and a drawer engaging slide releasably attached to the drawer.

The drawer engaging drawer slide 10 comprises a rear attachment member 12 for engaging and securing the rear portion of the drawer 2. In a preferred embodiment of the present invention, the rear attachment 12 comprises a rear hook that engages a corresponding notch or aperture in the rear of the drawer. In this manner, the rear portion of the drawer is securely engaged to the drawer slide. The drawer is slideable into engagement with the rear hook such that it may be disengaged from the hook by sliding the drawer toward the front of the drawer engaging slide member.

Toward the front of the drawer engaging slide member 10, catch means 20 are provided for engaging the front locking lever on the drawer. The catch means 20 comprise ridges, notches, or apertures in the drawer engaging slide member 10. In one embodiment of the present invention, the catch means are formed as an integral part of the drawer engaging slide member 10. Thus, the catch means may be formed simultaneously with the drawer engaging slide member 10 to accommodate the front locking device of the present invention. This design provides for maximum strength and rigidity in the catch means.

However, it is often desired to provide a standardized drawer slide, for use in a variety of slide systems, and allow the front locking arrangement to be added on, after manufacture of the drawer slides. Therefore, in a preferred embodiment of the present invention, the catch means comprises a catch insert 20, preferably constructed of plastic, which is inserted into an aperture 14 in the drawer engaging slide member. The catch insert comprises a plurality of grooves and rails 22 which provide varied surfaces for engaging the tooth 32 on the locking lever 30.

The catch means 20 are preferably positioned at the front of the drawer engaging slide member 10 on an inward facing side thereof. In this position, the catch means are aligned perpendicular to the sliding direction of the drawer and drawer slides and the individual grooves and ridges face inward toward the center of the drawer cavity.

In a further embodiment of the present invention, a locking lever 30 comprising at least one tooth 32 is mounted to the drawer 2. The locking lever 30 is preferably mounted to the underside of the drawer 2 extending toward the rear of the drawer with the tooth extending substantially perpendicular to the sliding direction of the drawer to engage the drawer engaging slide member 10, and the catch means 20 located thereon.

In a preferred embodiment of the present invention, the locking lever 30 is mounted to the drawer 2 in a pivotable manner by a screw 38 or other similar means of attachment. The locking lever is rotatable around the screw 38 to provide movement of the tooth 32 toward or away from the catch means 20. In a most preferred embodiment of the present invention, the locking lever 30 is provided with a plurality of teeth 32 aligned in the direction of the drawer's movement.

In another embodiment of the present invention, the teeth 32 are pointed toward the outside of the drawer to readily engage the catch means 20 mounted on an inner facing side of the drawer engaging slide member 10.

The locking lever 30 further comprises spring means 40 for urging and encouraging the teeth 32 to engage the catch means 20. In one embodiment of the present invention, a spring is provided toward the front of the locking lever 30 in a position further toward the front of the drawer 2 than the position of the screw 38. The spring means 40 urges the front portion of the locking lever toward the inner portion of the drawer, thereby pivoting the locking lever 30 and urging the rearward portion of the locking lever toward the catch means 20. In this manner, the teeth 32 on the locking lever 30 are urged toward and retained in engagement to the catch means 20.

In a most preferred embodiment of the present invention, the spring means 40 comprises a curved, flexible member engaged to or formed from the locking lever. The curved flexible member is positioned between the front portion of the locking lever and the side of the drawer so as to provide a spring force urging the front portion of the locking lever toward the center of the drawer.

The teeth 32 are disengaged from the catch means 20 by exerting a force on the front portion of the locking lever 30 to compress the spring and subsequently pivot the rear portion of the locking lever 30 away from the catch means. When the teeth 32 have disengaged from the catch means 20, the front of the drawer is free to be removed from and disengaged from the drawer engaging slide member. In this manner, the drawer is removed from the drawer slide system.

In one preferred embodiment of the present invention, the front locking device provides adjustable positioning between the front of the drawer and the front end of the drawer engaging slide member. The plurality of grooves and ridges comprising the catch means on the drawer slide engagement member are each equally capable of engaging and securing the tooth on the locking lever. The alignment of the grooves and ridges allowed for the tooth or teeth to selectively engage a groove or ridge. If an adjustment in the spacing of the drawer relative to the drawer engaging drawer slide is to be made, the tooth on the locking lever can be disengaged from one groove and reengaged to another, thereby adjusting the drawer relative to the drawer engaging slide member.

In an embodiment of the present invention employed with two sets of drawer slide systems, one on either side of the drawer, two front locking devices are provided, one for each set of drawer slides. The locking lever 30 and catch means 20 are preferably positioned at the front portion of the drawer 2 and drawer engaging slide member 10, respectively. In this manner, the locking lever is near the front-most area of the underside of the drawer and is easily accessible.

In a further preferred embodiment of the present invention, guide elements are provided to assist in the engagement and alignment of the drawer with the drawer engaging slide member. An inclined surface 24 is provided at the front of the catch means for guiding and aligning the locking lever 30 toward the catch means. This ensures that the tooth or teeth are properly situated to engage the catch means.

In another embodiment of the present invention, the locking lever 30 is mounted to the drawer through a base plate 50. The base plate 50 further comprises a drawer slide engaging member 54. The drawer slide further comprises a drawer slide guide 52, which together with the drawer slide engaging member ensures further that the lateral and vertical positioning of the drawer slide and locking lever are accurate. In this manner, the drawer engaging slide member 10 is firmly secured in place between the locking lever 30 and drawer slide guide 52 and drawer slide guide engaging member 54 configuration.

In a preferred embodiment of the present invention, the front locking device is mounted in conjunction with what is commonly referred to as an undermount drawer slide configuration. In this configuration, the drawer engaging slide member extends along the underside of the drawer. In an alternate drawer slide configuration, the drawer engaging slide member extends along the side of the drawer. In this configuration, the parts and components of the present invention, including the catch means, locking lever with tooth, and spring element, are oriented on the side of the drawer to engage and lock the drawer to the drawer slide. However, the principles of the present invention remain the same.

Although the present invention has been described with reference to particular embodiments, it should be recognized that these embodiments are merely illustrative of the principles of the present invention. Those of ordinary skill in the art will appreciate that the apparatus and methods of the present invention may be constructed and implemented in other ways and embodiments. Accordingly, the description herein should not be read as limiting the present invention, as other embodiments also fall within the scope of the present invention.

What is claimed is:

1. A system for releasably securing a drawer slide directly to the underside of a drawer comprising:
   a drawer slide comprising an aperture;
   a catch insert having a plurality of alternating ridges and grooves longitudinally spaced and horizontally aligned in a direction parallel to a sliding direction of a drawer, wherein the catch insert extends through the aperture such that the plurality of alternating ridges and grooves of the catch insert extend beyond a surface of the drawer slide adjacent the aperture; and
   a device configured to be mounted to the underside of a drawer, comprising
      a locking lever comprising a plurality of teeth corresponding to the plurality of ridges and grooves of the catch insert, said plurality of teeth of the locking lever being longitudinally spaced and horizontally aligned in a direction parallel to the sliding direction of the drawer, wherein the locking lever pivots between a first position having at least one tooth engaged with a corresponding groove of the catch insert and a second position having said at least one tooth disengaged from said corresponding groove, and said locking lever configured to be pivotably mounted to the underside of the drawer; and,
      a spring means urging said at least one tooth of the locking lever to be engagingly received within said corresponding groove of the catch insert.

2. The system of claim 1, wherein each of the ridges and grooves of the catch insert extends in a direction perpendicular to the sliding direction of the drawer.

3. The system of claim 1, each of the teeth of the locking lever extends in a direction perpendicular to the sliding direction of the drawer.

4. The system of claim 1, wherein the spring means comprises a spring member positioned toward a front of the drawer in advance of a pivot point of the locking lever.

5. The system of claim 1, further comprising a rear attachment member extending from the drawer slide configured to secure and retain a rear portion of the drawer.

6. The system of claim 1, wherein the device further comprises a drawer slide engaging member comprising a protrusion, wherein the protrusion is configured to ensure engagement between the locking lever and the catch insert.

7. The system of claim 6, wherein the drawer slide further comprises a drawer slide guide, the drawer slide guide configured to engage the protrusion.

8. A front locking system for releasably securing a drawer to a drawer slide in an undermount configuration comprising:

a catch insert extends through an aperture of a drawer slide, wherein the catch insert comprises a plurality of alternating ridges and grooves longitudinally spaced and horizontally aligned in a direction parallel to a sliding direction of a drawer, wherein the plurality of alternating ridges and grooves faces a direction substantially perpendicular to the sliding direction of the drawer, and wherein the plurality of alternating ridges and grooves extend through the aperture beyond a surface of the drawer slide adjacent to the aperture;

a locking lever comprising a plurality of teeth corresponding to the plurality of ridges and grooves of the catch insert, said plurality of teeth of the locking lever being longitudinally spaced and horizontally aligned in a direction parallel to the sliding direction of the drawer, wherein the locking lever pivots between a first position having at least one tooth engaged with a corresponding groove of the catch insert and a second position having said at least one tooth disengaged from said corresponding groove, and said locking lever being pivotably mountable to the underside of the drawer;

a spring means urging said at least one tooth of the locking lever to be engagingly received within said corresponding groove of the catch insert; and a drawer slide engaging member comprising a protrusion, wherein the protrusion is configured to ensure engagement between the locking lever and the catch insert.

* * * * *